April 28, 1931.  T. V. HEMMINGSEN  1,803,250
INTERNAL COMBUSTION ENGINE
Filed May 2, 1928
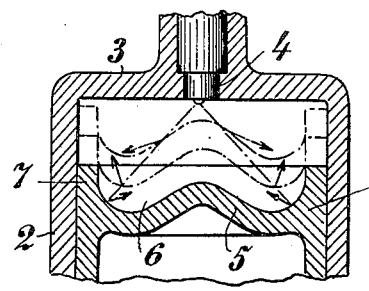
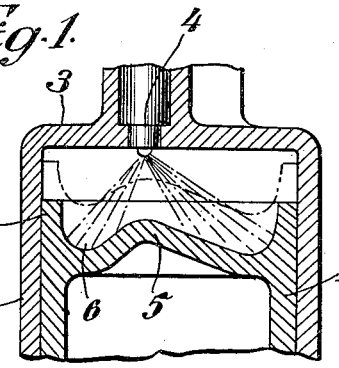
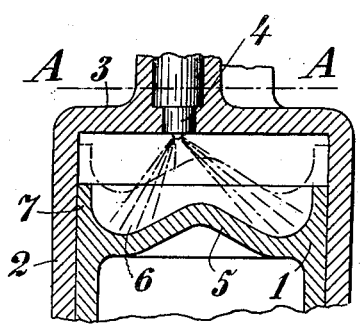
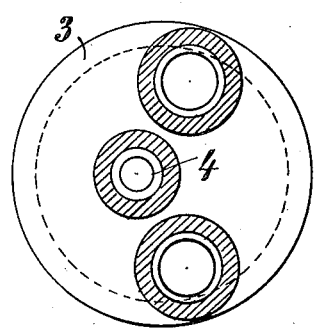

Patented Apr. 28, 1931

1,803,250

UNITED STATES PATENT OFFICE

TORKILD VALDEMAR HEMMINGSEN, OF COPENHAGEN, DENMARK

INTERNAL-COMBUSTION ENGINE

Application filed May 2, 1928, Serial No. 274,635, and in Denmark May 12, 1927.

This invention relates to that class of internal combustion engine in which the fuel is injected into the combustion chamber under pressure and in which slow combustion of the fuel takes place during the working stroke of the piston, the latter being provided with an annular cavity surrounding a conical, dome-shaped or similar crown or projection on the end of the piston. In engines of the class described, it has already been suggested to create a whirling current of air in said cavity and to inject the fuel either by means of a central fuel spraying nozzle in jets directed over the cavity, or by means of an eccentrically situated fuel spraying nozzle adapted to deliver the fuel in jets directed into the cavity and tangential or approximately tangential to the centre line of the annular cavity so as to direct the fuel along the cavity. It is a well-known fact that the fuel economy in an engine of the class first above mentioned depends upon the extent to which perfect combustion of the fuel takes place at the beginning of the working stroke, inasmuch as an early combustion with inconsiderable afterburning of the charge permits of smaller consumption of fuel for the same output, than does a prolonged afterburning which may possibly extend over the whole period of the working stroke. Prolonged after-burning may be due to the fact that the atomized fuel does not as a whole come into a sufficiently intimate contact with the oxygen of the air of combustion during the period of injection, the said intimate contact with the oxygen thus taking place, with regard to part of the fuel, at a later stage of the working stroke and possibly so late that some of the fuel passes unburnt through the engine. It is of the greatest importance, in order to obtain a perfect and early combustion, that the form of the combustion space and the spraying direction of the fuel sprayed are so adjusted that every single particle of the fuel comes into contact, and intimately so, with the requisite number of molecules of oxygen already during the first portion of the working stroke. The term combustion space, as used in connection with an engine of the kind dealt with here, indicates the hollow space restricted, during the first portion of the working stroke, by the top of the piston, the portion of the internal cylinder surface between the top of the piston and the cylinder cover and the cover itself. In consequence of this definition the combustion space is a space of varying size and form, inasmuch as its size is increased during the outward movement of the piston from its inner dead centre position to the end of the period of injection. According to the present invention, in an engine of the class first above described, the fuel is evenly distributed throughout the combustion space of the engine by causing the whole of the fuel to be delivered substantially uniformly around the crown of the piston in jets so directed that, when the piston is at the end of its instroke, the fuel strikes the crown of the piston and is deflected thereby into the annular cavity, from whence it is deflected back into the combustion space, the direction of the jets of fuel being such that, as the piston moves outwards, the fuel strikes the end of the piston at points gradually increasing in distance from the centre of the piston until substantially the whole or the greater part of the annular cavity of the piston is swept by the fuel. The invention is illustrated in the accompanying drawing in which Figs. 1, 2 and 4 show diagrammatically, and in sectional longitudinal view two different constructional forms of an arrangement according to the present invention. Fig. 3 shows a cross section according to A—A in Fig. 2. The present invention serves to remedy the drawbacks experienced with the known construction, as in accordance with the invention, the combustion space is of such a form that the air for combustion is caused to gather at the point where the combustion actually takes place, and further care is taken that the fuel is sprayed in such a manner that the combustion space is traversed as completely as possible by the fuel particles. In Figs. 1 to 3 the reference character 1 indicates the piston, 2 the cylinder, 3 the cylinder cover and 4 the spraying nozzle. In the constructional form illustrated in Fig. 1, the piston is provided with a centrally raised conical or dome-shaped portion 5 occupying the space which cannot advantageously be reached by the sprays of fuel. This portion of the piston is surrounded by an annular groove 6 which is outwardly circumscribed by a projecting collar 7, this annular groove merging in the said collar through an evenly rounded surface with a relatively large radius of curvature. The fuel is sprayed from the nozzle 4 in such a direction that the jets of fuel, when the piston is at the inner end of its stroke, strike the raised central portion 5 of the piston, at a short distance from the cylinder axis and are deflected as indicated by the arrows in the drawing, two different positions of the piston being shown in dot and dash lines and a third position in full lines. When the piston moves downwards the points at which the sprays strike the piston will continuously change into new ones at increasing distances from the cylinder axis, and at the same time the angle at which the sprays of fuel meet the surface, and the angles at which the particles of fuel are thrown back will undergo considerable changes during the relatively short movement made by the piston in the period of spraying. Accordingly the combustion space, in this period, will be traversed by the fuel particles so that these latter will continuously be capable of meeting the requisite number of molecules of oxygen. The spraying holes in the spray nozzle are of such a size and adapted at such directions and in such numbers that the best possible distribution of the fuel may be obtained. Instead of a single spraying nozzle there may be arranged several such spraying nozzles. The constructional form illustrated in Figs. 2 and 3 differs from that shown in Fig. 1 by the spraying nozzle being arranged eccentrically. This is especially advantageous in the construction of the cylinder cover, as the cooling fluid may follow more freely around the valve housings, as will be understood from Fig. 3. According to the invention the dome-shaped or similarly formed projecting portion of the top of the piston may also be eccentrically disposed in relation to the cylinder axis, as shown in Figure 4. In this case the spraying holes in the spraying nozzle or nozzles are preferably arranged in such a manner or made of such differing sizes that every sector of the combustion chamber is supplied with that quantity of fuel proportional or approximately proportional to its volume.

I claim:—

1. In an internal combustion engine of the class in which slow combustion of the fuel takes place during the working stroke of the piston, the combination with a piston, the head of which is provided with an annular cavity surrounded by an annular projecting collar along the circumference of the piston and surrounding a substantially cupola-shaped projection on the end of the piston, the top of said projection being substantially flush with the top of the said projecting collar, of a fuel spraying nozzle from which the fuel is injected in a number of jets distributing the fuel substantially uniformly around the projection of the piston, the jets being so directed that when the piston is at the end of its instroke the fuel strikes the projection of the piston and is deflected thereby into the annular cavity, whence it is deflected into the combustion space, the direction of the jets of fuel being such that during the outward stroke of the piston the fuel strikes the head of the piston at points gradually increasing in distance from the centre of the piston until substantially the whole of the annular cavity of the piston is swept by the fuel.

2. In a device as claimed in claim 1 an annular cavity the bottom of which merges into the annular projecting collar through an evenly rounded surface of large radius of curvature.

3. An internal combustion engine as claimed in claim 1 characterized by the fact that the injecting nozzle is eccentrically disposed in relation to the cylinder axis.

4. An internal combustion engine as claimed in claim 1, characterized by the fact that the projection on the end of the piston is eccentrically disposed in relation to the center of the piston.

5. An internal combustion engine as claimed in claim 1, characterized by the fact that the delivery of the fuel is so distributed that every sector of the combustion space is supplied with that amount of the fuel approximately proportional to its volume.

In testimony whereof I affix my signature.

TORKILD VALDEMAR HEMMINGSEN.